J. M. HANSEN.
APPARATUS FOR PREPARING BLANKS FOR THE MANUFACTURE OF CAR WHEELS.
APPLICATION FILED NOV. 15, 1909.
1,007,946.
Patented Nov. 7, 1911.
2 SHEETS—SHEET 1.
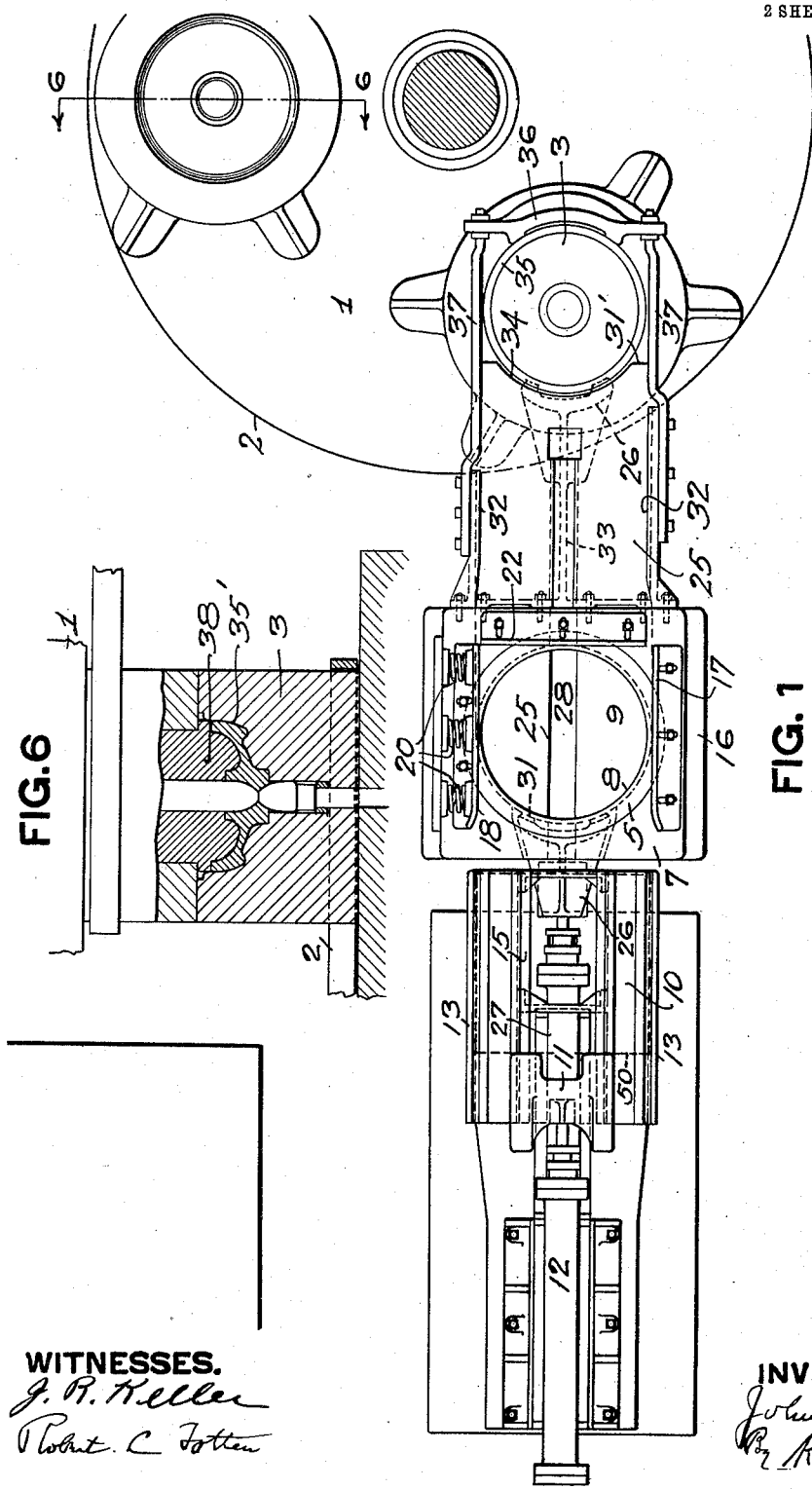
WITNESSES.
INVENTOR J. M. HANSEN.
APPARATUS FOR PREPARING BLANKS FOR THE MANUFACTURE OF CAR WHEELS.
APPLICATION FILED NOV. 15, 1909.
1,007,946.
Patented Nov. 7, 1911.
2 SHEETS—SHEET 2.
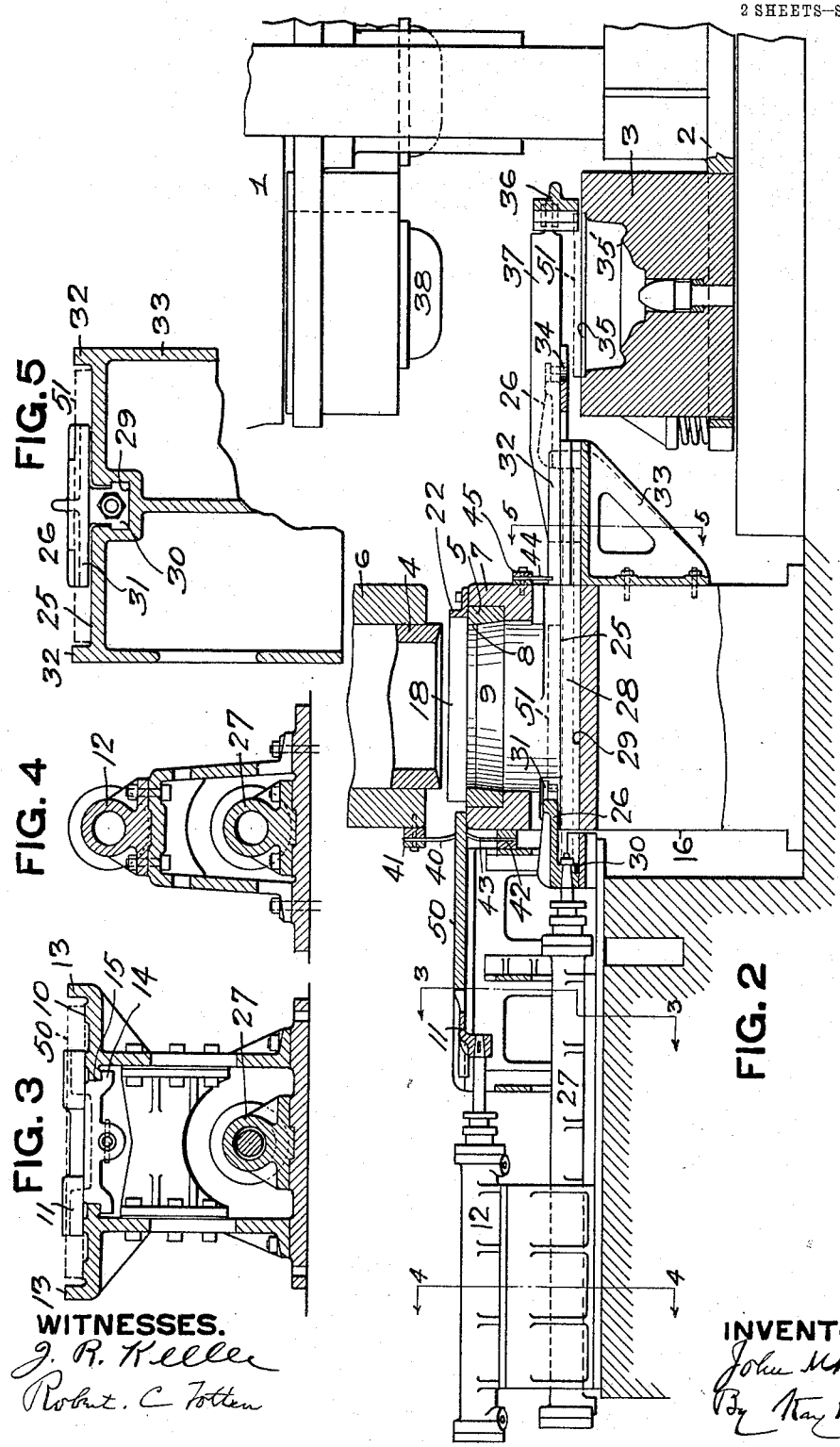
WITNESSES.
INVENTOR

UNITED STATES PATENT OFFICE.

JOHN M. HANSEN, OF PITTSBURGH, PENNSYLVANIA, ASSIGNOR TO FORGED STEEL WHEEL COMPANY, OF PITTSBURGH, PENNSYLVANIA, A CORPORATION OF PENNSYLVANIA.

APPARATUS FOR PREPARING BLANKS FOR THE MANUFACTURE OF CAR-WHEELS.

1,007,946. Specification of Letters Patent. Patented Nov. 7, 1911.

Application filed November 15, 1909. Serial No. 528,205.

*To all whom it may concern:*

Be it known that I, JOHN M. HANSEN, a resident of Pittsburgh, in the county of Allegheny and State of Pennsylvania, have invented a new and useful Improvement in Apparatus for Preparing Blanks for the Manufacture of Car-Wheels; and I do hereby declare the following to be a full, clear, and exact description thereof.

My invention relates to apparatus for forming blanks and feeding the same to wheel forming mechanism such as to the dies for forging car wheels, its object being to provide means by which heated angular slabs can be quickly handled, as received from the heating furnace by which they can be fed to the shearing dies, sheared into circular form and then fed to the wheel forming mechanism.

It comprises, generally stated, shearing dies for shearing a circular blank having a table in line with the anvil die thereof and a pusher adapted to travel over the said table and deliver the blank onto said anvil die, a table below such anvil die and a second pusher below the first pusher and traveling over the lower table adapted to deliver the blank to the wheel forming mechanism.

It also comprises certain other improvements such as suitable guides and centering mechanisms for the slab and the blank formed therefrom as well as other improvements in the details of construction.

In the accompanying drawings Figure 1 is a plan view showing the apparatus and the forging press with which it is preferably used, part being shown diagrammatically; Fig. 2 is a side view partly broken away; Fig. 3 is a cross section on the line 3—3 Fig. 2; Figs. 4 and 5 are cross sections on the lines 4—4 and 5—5 Fig. 2; and Fig. 6 is a sectional view showing the forging operation.

The apparatus is illustrated as used in connection with a wheel forging press such as set forth in Letters Patent No. 922,392, granted to Andrew Christianson May 18, 1909. The said press is illustrated at 1 having the rotating platen 2 carrying the female die 3 to which the blank formed is delivered. The apparatus is supported on a suitable foundation at one side of the forging press and it has the shearing dies 4 and 5, the upper or reciprocating shearing die 4 being operated by any suitable means such as by means of a hydraulic press, the lower portion of the same being shown at 6. The lower shearing or anvil die 5 is supported in a suitable frame 7 and has the shearing edge 8, forming the central opening 9 corresponding to the exact shape of the finished blank. On the same plane as that of the anvil die is the receiving table 10, and in line with and traveling over the same is the pusher head 11, said pusher head being operated by a suitable hydraulic ram 12 having suitable pipe connections therewith. The table 10 has suitable side guides 13, the heated slab being delivered upon said table between the guides, and the pusher head 11 has the guiding lips 14 engaging with the inner edges 15 of the table, so guiding the pusher head in its movement over the table. The anvil 16 supporting the anvil die 5 has suitable side or centering guides 17, 18, the guides 17 being stationary when in use, being adjusted to proper position so as to center the slab on that side of the anvil die, while the side guide 18 is yielding, being controlled by springs 20 so that as the blank is pushed off the table 10 onto the anvil die it is forced by said yielding side guide up against the stationary side guide and thus properly centered on the anvil die. A suitable adjustable stop 22 is supported on the bed plate 16 of the anvil to locate the blank properly length-wise on the anvil die.

Below the anvil die 5 is the receiving table 25 which extends out and overhangs the female die 3 of the press in position to deliver the blank onto the same, and traveling over said table 25 is the pusher head 26 operated by the hydraulic ram 27 supported on the frame of the machine under the ram 12 and of sufficient length to provide a length of stroke for said pusher head sufficient to deliver the blank to the female die of the forging press. Said hydraulic ram has suitable pipe connections for the operation of the same. The pusher head 26 is guided in its stroke in the guide way 28 which extends centrally of the table 25 a sufficient distance to feed the blank to the forging press, the guide-way 28 having the seat 29 in which the base 30 of the pusher head 26 travels. The pusher head 26 has the curved or concave face 31 to receive the circular blank and carry it forward, the blank traveling between the guides 32 of the table 25. The rear end of said table 25 overhangs the female die of the forging press, being supported in suitable brackets 33 and having a concave edge portion 34 preferably corresponding to the shape of the blank in line with the seat 35 of the female die 3 so that the blank is brought by the pusher head 26 into line with said seat and drops through the feeding opening 35 onto the female die. To provide a stop against which the blank is brought I employ the yoke 36 supported by the straps 37 secured to the brackets 33 supporting the overhanging end of the table 25. The female die 3 has below the seat 35 the matrix 37 into which the blank is pressed by the plunger die 38, the blank being carried on the platen 2 so as to bring the female die 3 under said plunger. Said blank forging mechanism is shown simply as illustrative of any suitable forging mechanism desired to be employed.

As the blanks are raised to a high forging heat in the furnace loose scale is raised on the surface of the same and it is necessary to remove such scale to prevent its being worked into the body of the wheel in the forging thereof. To remove such scale I employ suitable brushes located in the course of the travel of the slab when fed to the shearing dies or in the course of the travel of the circular sheared blank through the forging press or both. I prefer to locate such brushes between the feeding table 10 and the anvil die 5, and to provide such brushes both above and below the slab. The brushes are preferably formed of narrow spring plates 40 supported at one end, for example, being held in the brush holder 41 secured to the frame 6 of the reciprocating shearing die 4, the free ends of the brush blades extending down from such holder in position to contact with the top face of the slab. A like brush holder 42 is secured for example, to the anvil 16 and carries the brushes 43 extending up into the course of travel of the slab so as to contact with the lower face thereof. A like set of brushes may be secured in the course of the travel of the circular sheared blank to the forging press, and the same are illustrated at 44 extending down from the brush holder 45 secured to the anvil 16.

In the use of the apparatus the heated slab 50 is drawn from the furnace and carried to and placed upon the receiving table 10 by any suitable crane, resting thereon between the guides 13, and the pusher head 11 then pushes it forward onto the anvil die 5 against the stop 22, the slab passing between the side guides 17 and 18 and being forced by the spring operated side guide 18 against the stationary guide 17 in this way being centered upon the anvil die 5. The upper shearing die 4 then descends and cuts a circular blank 51 from the slab and it drops through the central opening 9 thereof upon the table 25. As the blank is pushed upon the anvil die the brushes 40 and 43 contact with the upper and lower faces of the slab and brush or scrape therefrom the loose scale, so feeding the slab freed from scale to the shearing dies. When the blank drops from the shearing dies, and as it rests on the table 25, the pusher head 26 advances and carries it along said table between the side guides 32, said blank being also held central by the concave face 31 of the pusher head and the blank being thus brought into contact with the stop 36 and pushed over the edge 34 and dropped through the feeding opening 31 into the anvil die, being thus brought directly over the seat 35 thereof and supported centrally of the matrix 37 by said seat. The platen 2 then carries the matrix die 3 around under the plunger die 38 and the circular blank thus produced is subjected to the forging operation such as the first forging operation described in Letters Patent previously granted to me, for example, Letters Patent No. 866,020 dated Sept. 17, 1907. The apparatus provides for the rapid handling of the heated slabs, the clearing of the same of scale, the shearing of the circular blanks and the feeding of the same to the forging mechanism. As the slabs can be rolled to a practically exact thickness and the blanks are in this way sheared into exact circular form and the diameter desired, I am thus enabled to provide blanks of practically exact weight and size proper for forging into wheels, and I am also enabled to provide the circular blanks with true circular edges of exact edge width, or thickness of blank, and to quickly center the blanks so as to shear them around their entire edges and provide true circular blanks while forming very little waste of metal in producing the circular blanks from the square or other rectangular slabs. The operation is so rapid that the blank is fed to the forging dies at practically the heat at which it is withdrawn from the furnace.

What I claim is:

1. In apparatus for shearing circular slabs, the combination of an anvil die, a receiving table at the side of the die, a pusher traveling over said table and adapted to deliver the blank to the anvil die, a reciprocating shearing die, a second receiving table under said anvil die, and a second reciprocating pusher traveling over said second receiving table to carry the sheared slab from under the anvil die.

2. In apparatus for shearing circular slabs, the combination of an anvil die, a receiving table at the side of the die, a pusher traveling over said table and adapted to deliver the blank to the anvil die, a reciprocating shearing die passing through the anvil die, a second receiving table under said anvil die, and a second reciprocating pusher having a concave pushing face traveling over said second receiving table to carry the circular sheared slab from under the anvil die.

3. In apparatus for shearing circular slabs, the combination of an anvil die, a receiving table at the side of the die, a pusher traveling over said table and adapted to deliver the blank onto the anvil die, centering mechanism having a yielding guide to center the blank on the anvil die, and a reciprocating shearing die.

4. In apparatus for shearing blanks, the combination of an anvil, a reciprocating shearing die above the same, a receiving table below the anvil having a guide-way thereon, a pusher traveling over said table, and a stop in the line with said pusher and supported beyond the end of the table adapted to limit the movement of the blank to permit it to drop beyond the table.

5. In apparatus for shearing blanks, the combination of an anvil, a reciprocating shearing die above the same, a receiving table below the anvil, a pusher traveling over said table, and a stop supported beyond the table a distance corresponding to the diameter of the shearing die so as to limit the forward movement of the blank and permit it to drop beyond the table.

In testimony whereof, I, the said JOHN M. HANSEN, have hereunto set my hand.

JOHN M. HANSEN.

Witnesses:
 ROBERT C. TOTTEN,
 J. F. WILL.

---

Copies of this patent may be obtained for five cents each, by addressing the "Commissioner of Patents. Washington, D. C."